(12) United States Patent
Kreischer et al.

(10) Patent No.: US 10,869,461 B1
(45) Date of Patent: Dec. 22, 2020

(54) INTERACTIVE RECIPROCATING PET TOY

(71) Applicants: Brian Kreischer, Fairport Harbor, OH (US); Steven Tsengas, Fairport Harbor, OH (US)

(72) Inventors: Brian Kreischer, Fairport Harbor, OH (US); Steven Tsengas, Fairport Harbor, OH (US)

(73) Assignee: COSMIC PET LLC, Wichita, KS (US)

( * ) Notice: Subject to any disclaimer, the term of this patent is extended or adjusted under 35 U.S.C. 154(b) by 159 days.

(21) Appl. No.: 16/164,832

(22) Filed: Oct. 19, 2018

Related U.S. Application Data

(60) Provisional application No. 62/575,792, filed on Oct. 23, 2017.

(51) Int. Cl.
  *A01K 15/02* (2006.01)
(52) U.S. Cl.
  CPC .................................. *A01K 15/025* (2013.01)
(58) Field of Classification Search
  CPC .............................. A01K 15/025; A01K 15/02
  USPC .................................................. 446/308–312
  See application file for complete search history.

(56) References Cited

U.S. PATENT DOCUMENTS

| | | | | |
|---|---|---|---|---|
| 708,358 | A * | 9/1902 | Honrath | A63H 13/20 446/246 |
| 6,568,353 | B2 * | 5/2003 | Van Sluis | A01K 15/025 119/702 |
| 6,571,742 | B1 * | 6/2003 | Tsengas | A01K 15/025 119/707 |
| 6,591,785 | B1 * | 7/2003 | Boshears | A01K 15/024 119/706 |
| 10,477,837 | B1 * | 11/2019 | Liu | A01K 15/025 |
| 2002/0187718 | A1 * | 12/2002 | Ritchey | A01K 15/025 446/71 |
| 2012/0234258 | A1 * | 9/2012 | Cook | A01K 15/025 119/708 |

* cited by examiner

*Primary Examiner* — Magdalena Topolski
*Assistant Examiner* — Katelyn T Truong
(74) *Attorney, Agent, or Firm* — Gugliotta & Gugliotta, LPA

(57) ABSTRACT

A pet toy is provided for the pet toy having an elongated housing with a flat lower surface secured to a bottom of said elongated housing and adapted to allow the elongated housing to sit flat and securely on a planar surface. A reciprocating mechanism contained within said center section and comprising a motor that physically communicates a linear reciprocating motion of a rack and pinion gear to a pair of opposed targets aligned along the centerline and extend outward from said first egress orifice. The target appendages are each comprised of a flexible, conformable and compressible member adapted to be withdrawn into the respective egress orifice and alternately extend outward from the respective egress orifice.

12 Claims, 5 Drawing Sheets

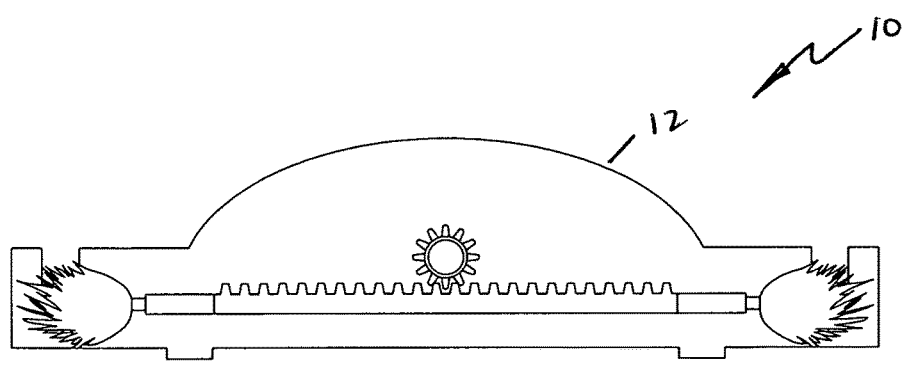
FIG. 4A
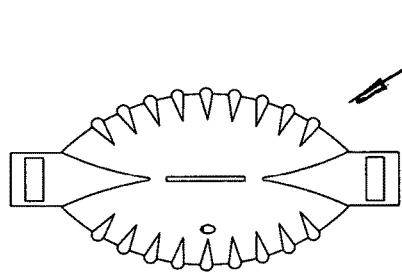
FIG. 4B
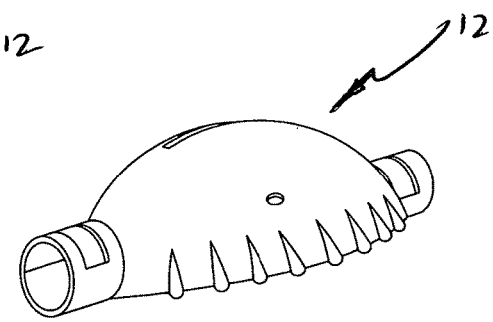
FIG. 4C
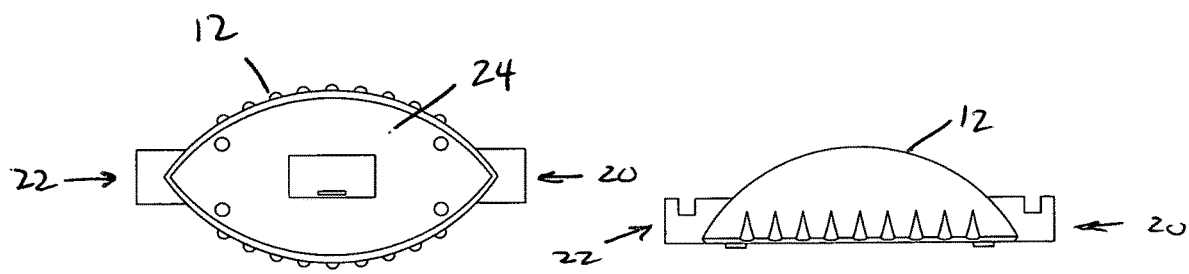
FIG. 4D
FIG. 4E

INTERACTIVE RECIPROCATING PET TOY

RELATED APPLICATIONS

The present invention claims benefit of U.S. Provisional Application Ser. No. 62/575,792, filed on Oct. 23, 2017 and incorporated by reference as if fully rewritten herein.

BACKGROUND OF THE INVENTION

1. Field of the Invention

The present invention relates generally to animal amusement devices and, more particularly, to a novel interactive toy for pets.

2. Description of the Related Art

Pet toys are intended to provide for healthy interaction with a pet and provide for stimulation of instincts that can exercise an animals mind or body. Many interactive pet toys will provide a motion or sound that generates a positive attraction for the pet, and hopefully will encourage greater stimulation through play. Other types of pet toys use edible treats attractants to instincts, through smell, taste or both, to generate a healthy stimulation. Many devices for promoting play and interaction with a pet are in existence today. Such toys, to be effective, must stimulate some instinctive behavior in the animal in order to garner, and retain, the animal's interest in the interaction. These toys can entertain a cat, dog or other pet; however, if the reaction of the toy becomes predictable the pet's attention tends to wain.

Motor powered toys are also known. These toys have a supported toy-like object that is moved mechanically in a manner that may attract the pet. However, this type of device does not promote interaction between the pet and the toy in that the motion imparted by the motor tends to be more automated and eventually generates a predictable movement pattern.

The above games tend to be of a type that may be labeled "pursuit-type" games, in that the toy is moved and the pet chases it. This type of game depends for its entertainment value on the pet being close enough to success in catching the toy to make the pet attempt to catch it, yet not close enough that it is overly easy. Such games often become equated by the pet to the game of "fetch". Some pets are simply uninterested in this game.

For the foregoing reasons, there is a need for a new type of pet and owner game that is more entertaining than the above summarized games. The new game should provide a structure that promotes a game that is of a type that is more nearly related to the human game of hide-and-seek, or the baby game of peekaboo, and that will capitalize on animals, particularly domestic animals innate interest in hit-and-run and am bush-type games where the hunter is rewarded for his patience. The game should be attractive to both young and old pets, and should maximize interaction between the pet and owner, while somewhat downplaying the need for continuous strenuous physical activity on the part of the pet, which may result in lessened interest.

Consequently, a need has been felt for providing a new type of pet and owner game that is of a type more nearly related to the human game of hide-and-seek, or the baby game of peekaboo, and that will capitalize on animals, particularly domestic animals innate interest in hit-and-run and ambush-type games where the hunter is rewarded for his patience.

SUMMARY OF THE INVENTION

It is thus an object of the present invention to provide a novel interactive toy for pets.

It is a feature of the present invention to utilize an interactive reciprocating dual pom pom target to provide interest for a pet to interact with such a toy.

The present invention provides a pet toy that provides for the pet toy comprising an elongated housing having a flat lower surface secured to a bottom of said elongated housing and adapted to allow the elongated housing to sit flat and securely on a planar surface. A reciprocating mechanism contained within said center section and comprising a motor, a first target reciprocating mechanism and a second target reciprocating mechanism. A first target and a second target are urged in a reciprocation motion for extension and retraction from each opposing ends through said first egress orifice and second egress orifice at each end of the housing. A rack and pinion gear in function operation with said motor generates the reciprocating motions. A first extension shaft physically communicates the linear reciprocating motion of the rack and pinion gear to a first target attachment coupling aligned along the centerline and extend outward from said first egress orifice. A first target appendage is connected to the attachment coupling and can be replaced when worn out. A second extension shaft physically communicates the linear reciprocating motion of the rack and pinion gear to the second target attachment coupling. The reciprocating motion may include variations such as random speeds and/or pauses. The shaft and second target attachment coupling are aligned along the centerline and extend outward from said second egress orifice. A second target appendage connects to the attachment coupling. The target appendages are each comprised of a flexible, conformable and compressible member adapted to be withdrawn into the respective egress orifice and alternately extend outward from the respective egress orifice.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4A is a cross sectional view thereof;

FIG. 4B is a top plan view thereof;

FIG. 4C is a perspective view thereof;

FIG. 4D is a bottom plan view thereof;

FIG. 4E is a left side elevation view thereof; and

DESCRIPTION OF THE PREFERRED EMBODIMENTS

Figure 1:
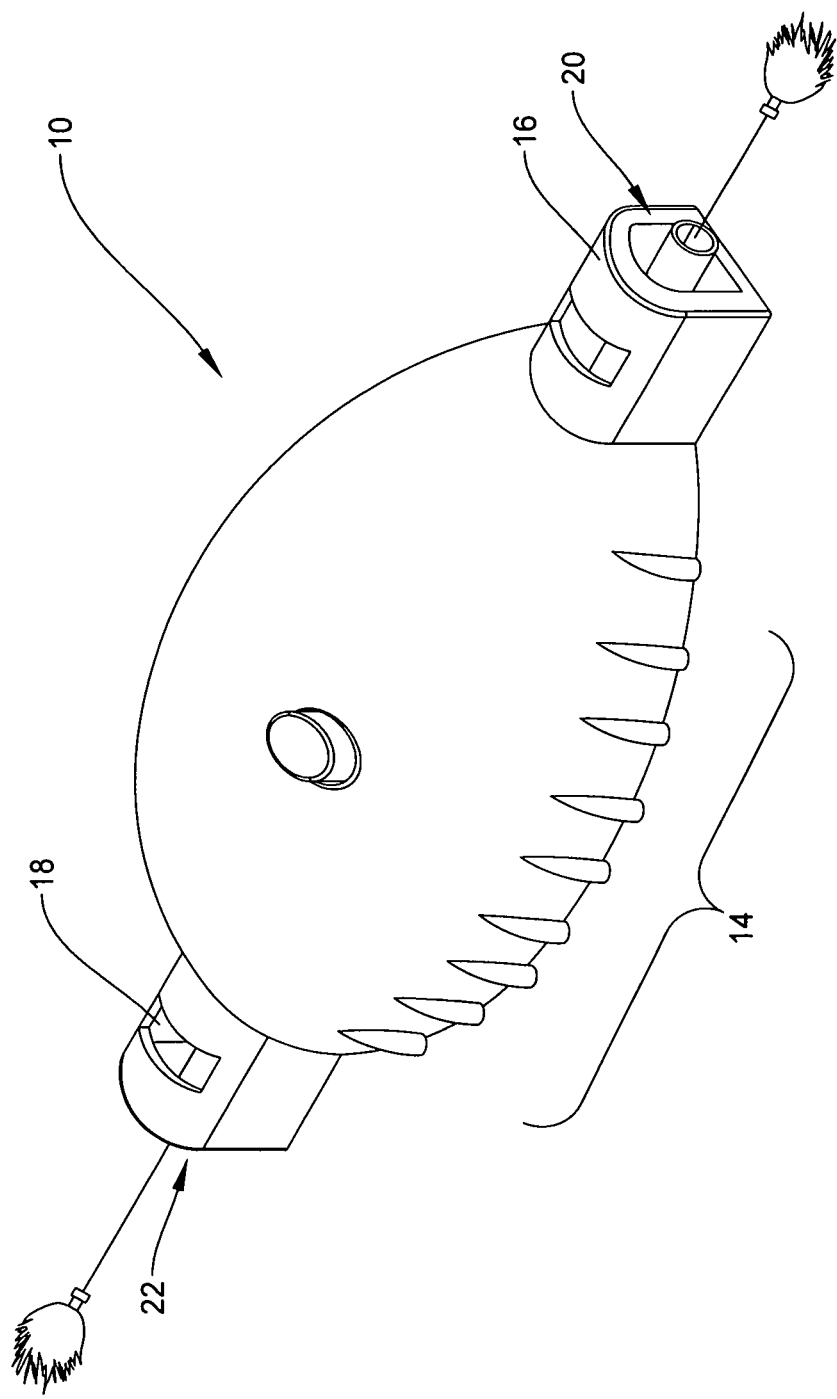
FIG. 1 is a front perspective view of an interactive reciprocating pet toy according to a preferred embodiment of the present invention.
Figure 2:
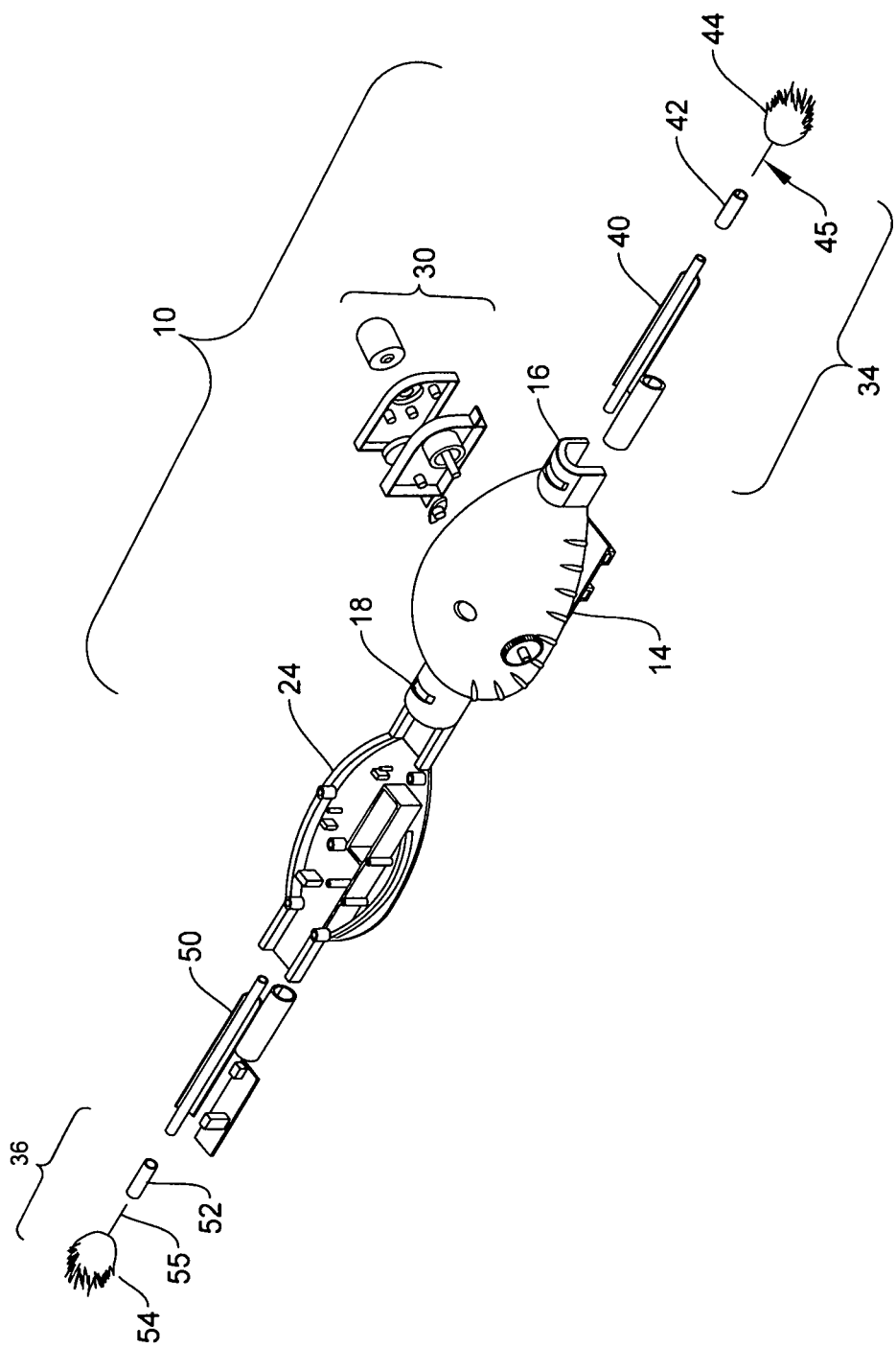
FIG. 2 is an exploded front perspective view thereof.
Figure 3:
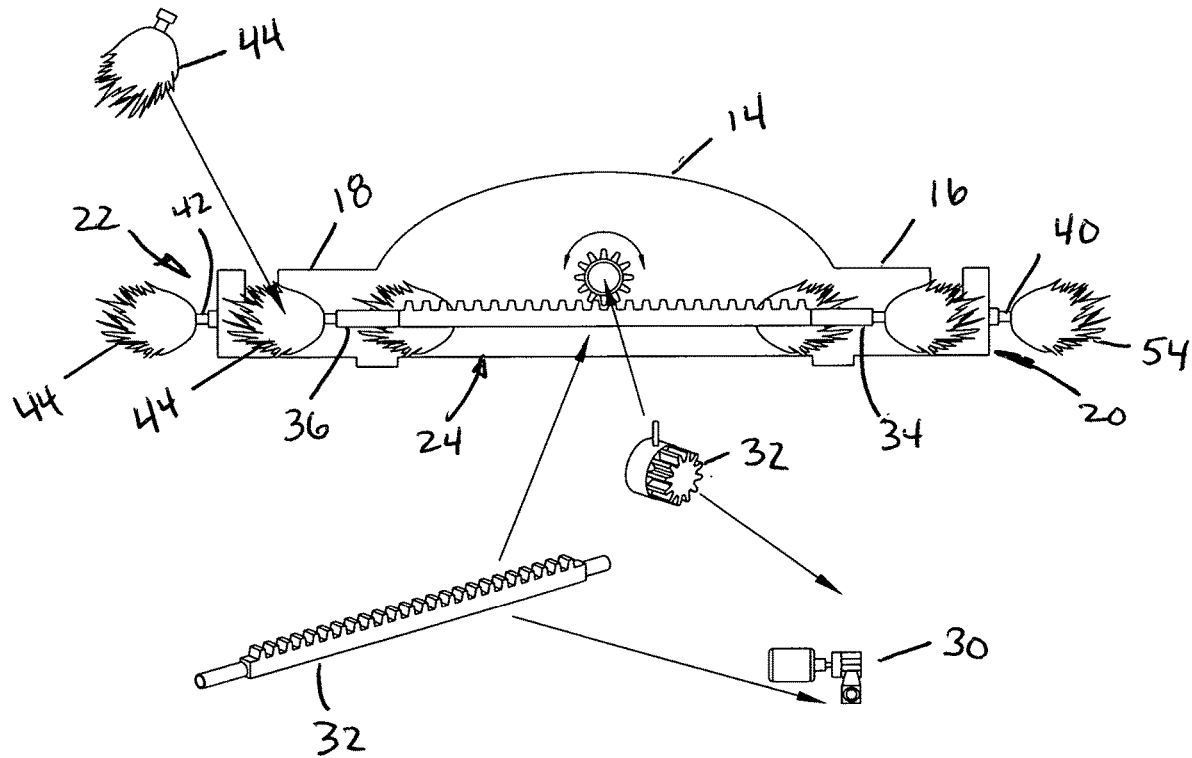
FIG. 3 is a schematic cross sectional view thereof.
Figure 5:
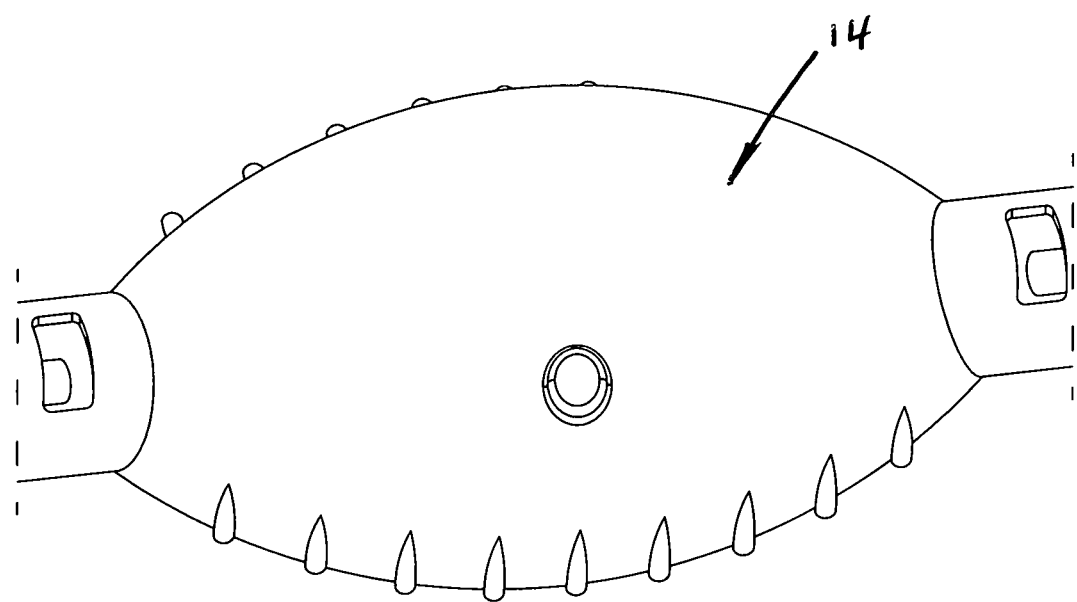
FIG. 5 is a top rendering thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, an interactive reciprocating pet toy according, generally noted as 10, is shown according to a preferred embodiment of the present invention. An elongated housing 12 having a horizontal centerline "CL" forms a generally bulbous center section 14 and protruding at each end with a first extension conduit 16 opposite a second extension conduit 18. Each extension conduit 16, 18 forms an egress orifice 20, 22 respectively. The housing 12 is intended on having a flat lower surface 24 such as to allow the toy 10 to sit flat and securely on the floor or similar planar surface.

The center section 14 forms a containment volume for holding a motor 30, a target reciprocating mechanism 32, a first target reciprocating mechanism 34 and a second target reciprocating mechanism 36. Each target reciprocating mechanism 34, 36 is formed similarly and operate each in a similar functional manner. According to one aspect of the present invention, the target reciprocating mechanism 32 may form a rack and pinion gear in function operation with the motor 30. The first target reciprocating mechanism 34 forms a first extension shaft 40 that physically communicates a linear reciprocating motion of the rack and pinion gear 32 to a first target attachment coupling 42. The shaft 40 and target attachment 42 are aligned along the centerline "CL" and extend outward from the first egress orifice 20 formed by the first extension conduit 16. The target attachment 42 provides for an impingement fitting for securing a first target appendage 44.

As indicated above, the second target reciprocating mechanism 36 forms a similar construction as the first target reciprocating mechanism 34 and comprises a second extension shaft 50 that physically communicates a linear reciprocating motion of the rack and pinion gear 32 to a second target attachment coupling 52. The shaft 50 and target attachment 52 are aligned along the centerline "CL" and extend outward from the second egress orifice 22 formed by the second extension conduit 18. The target attachment 52 provides for an impingement fitting for securing a second target appendage 54.

Each target appendage 44, 54 may be formed of a similar design or may comprise differing designs. However configured, each is envisioned as being flexible, conformable and compressible such as to be capable of being withdrawn into the respective egress orifice 20, 22 and alternately extend outward from the respective egress orifice 20, 22. According to one aspect of the present invention, each appendage 44, 54 may comprise an elongated feather (as shown) wherein each respective shaft 45,55 terminates by an impingement or compression fit to the respective attachment coupling 42, 52. It is also intended that the motion imparted on the targets may include randomness in speed and/or pauses.

In addition to the appendages comprising an elongated feather structure as shown, such target attachments 44, 54 may form alternate structures. Further still, the pet toy 10 may additionally include, in combination, other functionally equivalent mechanisms for capturing or retaining the attention of a pet. These may include, but are not limited to, the inclusion of audible generating devices, such as a sound device that preferably emits a prerecorded sound in response to movement or propulsion/retraction of the pet. This prerecorded sound can be a "permanent" prerecorded sound such as an animal's voice, such as "meow" or "purr," a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device is sensing motion of pet. Preferably, the sound simulates a natural prey of the pet, the pre-recorded sound is a simulated sound being reflective of the sound made by the natural prey, i.e., squeak for a mouse or chirp for a bird.

2. Operation of the Preferred Embodiment

In operation, a present interactive toy provides for stimulation of a pet through its reciprocation motion for extension and retraction of the targets from each opposing ends. The motor 30 urges the rack and pinion gear 32 to transfer the motors rotational motion into a linear reciprocating motion. This linear reciprocating motion thereby urges each feature target to alternately extend and retract such as to create a 'peekaboo' type of stimulus that will capitalize on a domestic animal's innate interest in hit-and-run and ambush-type games where the hunter is rewarded for his patience.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. Such improvements and are submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A pet toy comprising:
an elongated housing having a horizontal centerline forming a generally bulbous center section and protruding from each end of said center section with a first extension conduit forming a first egress orifice and opposite a second extension conduit forming a second egress orifice;
a flat lower surface secured to a bottom of said elongated housing and adapted to allow the elongated housing to sit flat and securely on a planar surface;
a reciprocating mechanism contained within said bulbous center section and comprising:
a motor, a first target reciprocating mechanism and a second target reciprocating mechanism, wherein said first target reciprocating mechanism and said second target reciprocating mechanism are urged in a reciprocation motion for extension and retraction from each opposing ends through said first egress orifice and second egress orifice;
a rack and pinion gear in function operation with said motor;
a first extension shaft that physically communicates a linear reciprocating motion of the rack and pinion gear to a first target attachment coupling;
said first extension shaft and said first target attachment coupling are aligned along the centerline and extend outward from said first egress orifice; a first target connected to said attachment coupling;
a second extension shaft that physically communicates a linear reciprocating motion of the rack and pinion gear to a second target attachment coupling;
said second extension shaft and said second target attachment coupling are aligned along the centerline and extend outward from said second egress orifice; and
a second target connected to said attachment coupling.

2. The pet toy of claim 1, wherein said first target and said second target are each comprised of a flexible, conformable and compressible member adapted to be withdrawn into the respective egress orifice and alternately extend outward from the respective egress orifice.

3. The pet toy of claim 2, wherein said first target and said second target each comprise an elongated feather having a shaft that terminates by impingement or compression fit to the respective target attachment coupling.

4. The pet toy of claim 1, wherein said first target and said second target are each comprised of a flexible, conformable and compressible member adapted to be withdrawn into the respective egress orifice and alternately extend outward from the respective egress orifice.

5. The pet toy of claim 4, wherein said first target and said second target each comprises an elongated feather having a shaft that terminates by impingement or compression fit to the respective target attachment coupling.

6. The pet toy of claim 1, wherein said reciprocation motion includes incongruences of speed and pauses.

7. A pet toy comprising:
an elongated housing having a horizontal centerline forming a center section and protruding from each end of said center section with a first extension conduit forming a first egress orifice and opposite a second extension conduit forming a second egress orifice;
a flat lower surface secured to a bottom of said elongated housing and adapted to allow the elongated housing to sit flat and securely on a planar surface;
a reciprocating mechanism contained within said center section and comprising:
a motor, a first target reciprocating mechanism and a second target reciprocating mechanism, wherein said first target reciprocating mechanism and said second target reciprocating mechanism are urged in a reciprocation motion for extension and retraction from each opposing ends through said first egress orifice and second egress orifice;
a rack and pinion gear in function operation with said motor;
a first extension shaft that physically communicates a linear reciprocating motion of the rack and pinion gear to a first target attachment coupling;
said first extension shaft and said first target attachment coupling are aligned along the centerline and extend outward from said first egress orifice;
a first target connected to said attachment coupling;
a second extension shaft that physically communicates a linear reciprocating motion of the rack and pinion gear to a second target attachment coupling;
said second extension shaft and said second target attachment coupling are aligned along the centerline and extend outward from said second egress orifice; and
a second target connected to said attachment coupling.

8. The pet toy of claim 7, wherein said first target and said second target are each comprised of a flexible, conformable and compressible member adapted to be withdrawn into the respective egress orifice and alternately extend outward from the respective egress orifice.

9. The pet toy of claim 8, wherein said first target and said second target each comprises an elongated feather having a shaft that terminates by impingement or compression fit to the respective target attachment coupling.

10. The pet toy of claim 7, wherein said first target and said second target are each comprised of a flexible, conformable and compressible member adapted to be withdrawn into the respective egress orifice and alternately extend outward from the respective egress orifice.

11. The pet toy of claim 10 wherein said first target and said second target each comprises an elongated feather having a shaft that terminates by impingement or compression fit to the respective target attachment coupling.

12. The pet toy of claim 7, wherein said reciprocation motion includes incongruences of speed and pauses.

\* \* \* \* \*